July 14, 1959
R. A. WITTREN
2,894,608
SELECTIVE BRAKE SYSTEM
Filed June 24, 1955
2 Sheets-Sheet 1
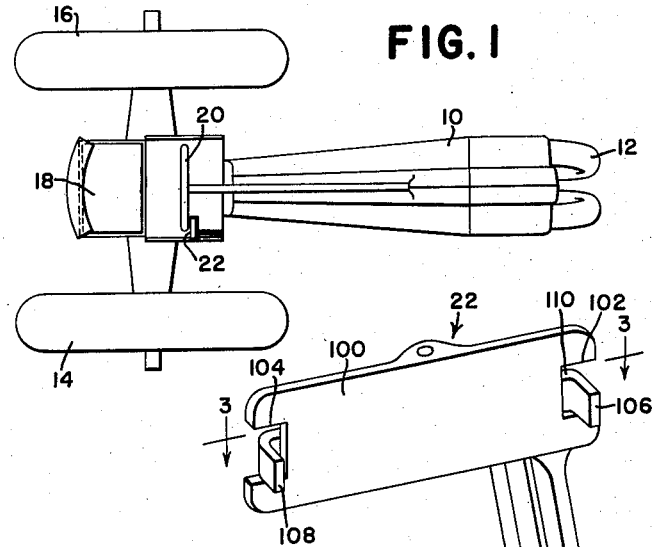
FIG. 1
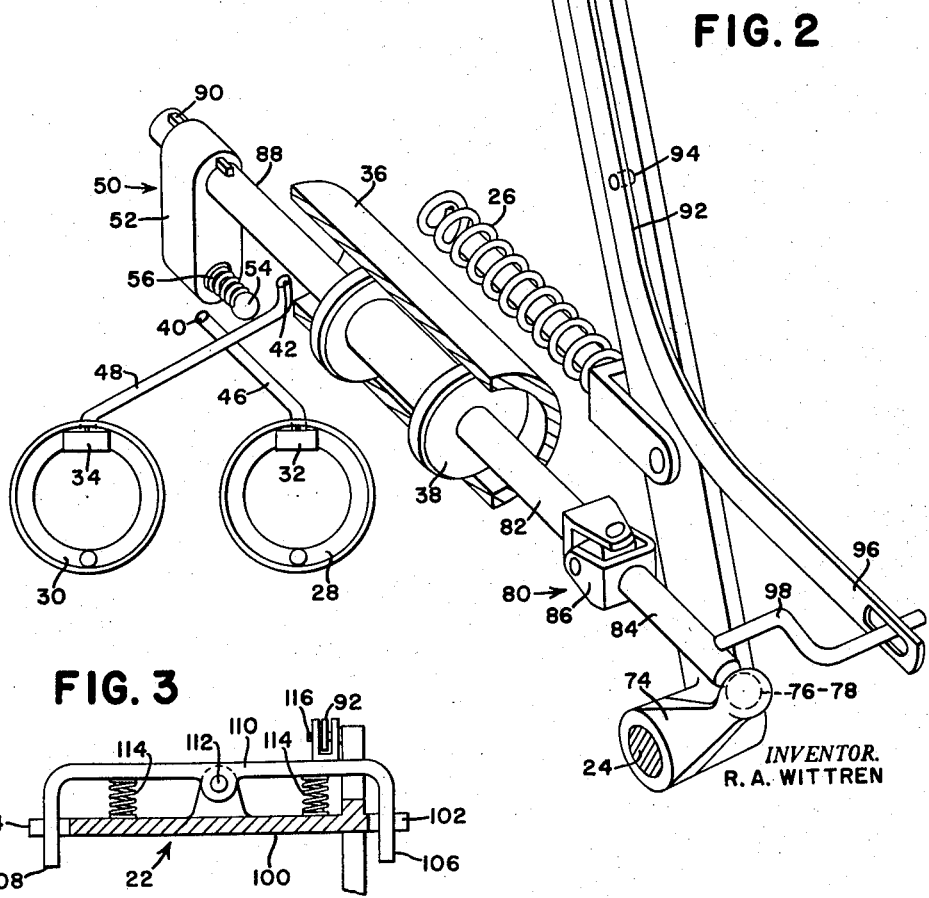
FIG. 2
FIG. 3
INVENTOR.
R. A. WITTREN July 14, 1959
R. A. WITTREN
2,894,608
SELECTIVE BRAKE SYSTEM
Filed June 24, 1955
2 Sheets-Sheet 2
FIG. 4
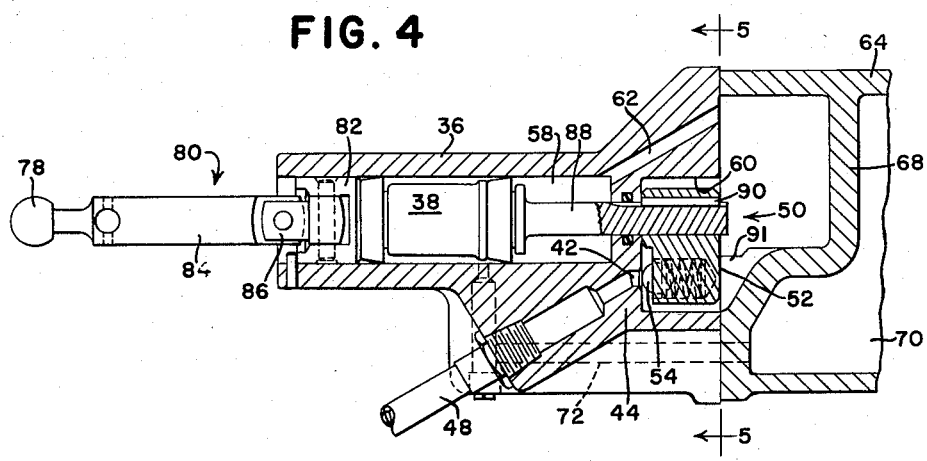
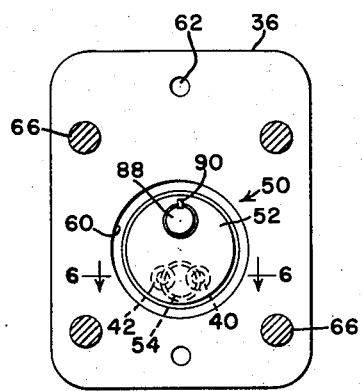
FIG. 5
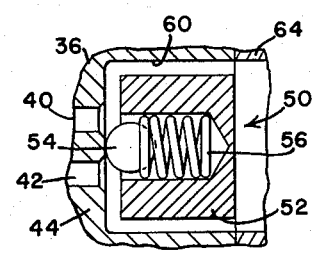
FIG. 6
*INVENTOR.*
R. A. WITTREN United States Patent Office 2,894,608
Patented July 14, 1959

2,894,608

SELECTIVE BRAKE SYSTEM

Richard A. Wittren, Cedar Falls, Iowa, assignor, by mesne assignments, to Deere & Company, a corporation of Delaware Application June 24, 1955, Serial No. 517,824

15 Claims. (Cl. 188—152)

This invention relates to a vehicle brake system and more particularly to a system in which multiple brakes may be selected for operation in unison or individually.

A system of the general character referred to above is particularly useful in such vehicles as the agricultural tractor, in which the individual brakes are used to assist steering. In the conventional tractor, each of the traction wheels is provided with an individual brake and the operator by depressing individual brake pedals may operate one of the brakes independently of the other. Depression of the brake pedals simultaneously will result in application of the brakes in unison. The present invention features a brake system utilizing only a single brake pedal for example, and means on the pedal for selecting a control position for determining whether the brakes will be operated individually or in unison. It is an important feature of the invention to utilize this feature in a hydraulic brake circuit having a master cylinder for controlling the transmission of fluid through a pair of ports, the ports being connected individually to right and left hand brakes. The piston, in addition to being axially movable in the master cylinder, is also angularly movable and angular movement is utilized to afford valve position selection. The invention further features a brake pedal on which is mounted a rockable selection member arranged so that the pedal may be depressed without contact with the selection member, or, the selection member may be depressed initially in one direction or the other to select the valve position via angular movement of either the piston or a rod connected to the piston.

The foregoing and other important objects and desirable features inherent in and encompassed by the invention will become apparent as a preferred embodiment thereof is disclosed in detail in the ensuing specification and accompanying sheets of drawings, the several figures of which will be described immediately below.

Fig. 1 is a plan view of a typical agricultural tractor.

Fig. 2 is a schematic view, partly in section and drawn to an enlarged scale, illustrating the system in its overall aspects.

Fig. 3 is a fragmentary sectional view, on a somewhat enlarged scale, as seen generally along the line 3—3 of Fig. 2.

Fig. 4 is a longitudinal sectional view through the master cylinder.

Fig. 5 is a sectional view seen substantially along the line 5—5 of Fig. 4.

Fig. 6 is an enlarged fragmentary sectional view taken on the line 6—6 of Fig. 5.

The tractor chosen for purpose of illustration comprises a longitudinal, relatively narrow body 10 carried at its front end on steerable wheel means in the form of a truck 12 and carried at its rear end by right and left hand traction wheels 14 and 16 respectively. An operator's seat 18 is located at the rear of the tractor conveniently to a steering wheel 20 and a single brake-actuating means in the form of a pedal 22.

The brake lever or pedal 22 is mounted in any appropriate manner on the tractor body, as by means of a transverse rockshaft 24 (Fig. 2) whereby the brake pedal may be depressed in a forwardly and downwardly direction. Return of the pedal to its release position is accomplished by any suitable biasing means, such as the spring means shown at 26. Associated with the traction wheels 14 and 16 in any well-known manner are, respectively, right and left hand brakes 28 and 30 which are respectively controlled, as by expansion and contraction by brake cylinders 32 and 34.

A master cylinder or controller 36 carries for axial as well as for angular movement therein a force-transmitting member in the form of a piston 38 for effecting the transmission of fluid selectively through either or both of right and left hand ports 40 and 42, respectively. These ports are formed in a front wall 44 of the master cylinder and are connected respectively to the right and left hand brake cylinders 32 and 34 by fluid lines 46 and 48, which serve as brake-applying elements. Whether the ports or elements are used or energized individually or in unison depends upon the position of control or valve means 50 comprising a radial control member or valve arm 52 and a ball valve 54 loaded by a spring 56, the details of which will become presently apparent.

As best shown in Fig. 4, the construction of the master cylinder 36 is such that the front wall 44 separates a piston chamber 58 from a valve chamber 60. A passage 62 interconnects the two chambers. A second housing 64, rigidly affixed to the front of the master cylinder 36, as by bolts 66 (Fig. 5), affords not only an enclosure wall 68 for the valve chamber 60 but also a reservoir 70 which communicates with the piston chamber 58 via a passage 72.

As will be apparent, the pedal 22 is a piston-actuating means and for this purpose it has integrally formed therewith an arm 74 which has its free end socketed at 76 to receive a ball 78 at the rear end of link means 80. This link means is made up of front and rear parts 82 and 84, respectively, and an interconnecting articulate or universal joint 86, the front part being rigidly connected coaxially to the rear of the master cylinder piston 38 and the rear part including the ball and socket connection at 76—78 to the brake lever arm 74. The universal joint and ball and socket connection accommodate the linear or axial movement of the piston and the arcuate movement of the arm 74 and permit the link means to be rotated for moving the piston 38 angularly, the reasons for which will presently appear.

A control rod 88 is rigidly affixed to the front of the piston and extends coaxially forwardly therefrom, having an axially splined or keyed connection 90 with the coaxial portion of the valve arm 52. The purpose of the spline is to interconnect the rod 88 and valve arm 52 for angular movement in unison while permitting axial movement of the piston 38 and rod 88 relative to the valve arm, the latter being confined in the valve chamber 60 between the master cylinder front wall 44 and a boss or equivalent portion 91 on the secondary housing wall 68 so as to be non-axially shiftable.

The valve means 50 is capable of angular movement among a neutral position centrally between the ports 40 and 42 in which the valve ball 54 uncovers both of the ports; a first active position in which the valve ball 54 partially enters and blocks only the port 42; and a second active position in which the valve ball partially enters and blocks only the valve port 40. Because of the spring loading by the spring 56, a detent effect is accomplished, the result of which is to yieldably retain or lock the valve arm in either of its port-blocking positions. As will be brought out below, the neutral or center position of the valve is maintained by centering means cooperative with selection means for controlling the position of the valve.

The selection means just referred to generally above comprises a control lever 92 pivoted intermediate its ends at 94 to the brake lever 22 on an axis parallel to the axis of the rockshaft 54. The lower end of the control lever 92, as at 96, is slotted to receive an arm 98 that is rigidly affixed to the rear part 84 of the link means 80. Since the brake lever is in the form of a pedal, it has an upper pedal portion or foot-receiving face 100, which face is notched at its right and left hand ends at 102 and 104 respectively to accommodate right and left hand ends 106 and 108 of a rockable control or selection member 110. The member 110 is pivoted intermediate its ends at 112 to the undersurface of the pedal face 100 and a pair of springs 114 represents one form of centering means for resiliently maintaining the neutral position of the member 110 as shown. The portions 106 and 108 of the member 110 project beyond the face 100 and are spaced apart across the face a sufficient distance to permit the face to accept an operator's foot out of contact with either of the portions 106 or 108. At the same time, the operator may, by shifting his foot laterally in one direction or the other, step on one or the other of the member portions 106 or 108, thus initially causing the member 110 to rock in the selected direction. Rocking of the member is transmitted to the control lever 92 by means of a pivotal connection 116 (Fig. 3). There are thus provided on the single pedal 22 a plurality of manual-force-receiving portions, namely 100, 106 and 108. The centering springs 114 normally maintain the neutral position of the rocking member 110 so that if the operator places his foot on the face 100 and out of contact with the portions 106 and 108, the piston 38 will be moved forwardly in the master cylinder without rotation or angular movement. Since the rocking member 110 is in its neutral position, the valve means 50 will be in its neutral position and fluid will be expelled from the cylinder 36 simultaneously through both ports 40 and 42 to apply the brakes 28 and 30 simultaneously.

If the operator desires to apply either brake individually, he may do so by rocking the rocking member 110 prior to depression of the pedal 22. For example, let it be assumed that the operator desires to make a right hand turn with the tractor. As is conventional, the shortness of the turn may be improved by braking the right hand wheel 14, so that the tractor tends to turn about a vertical pivot effected at the point of contact of the wheel 14 with the ground. Accordingly, before or simultaneously with depression of the pedal 22, the operator will shift his foot laterally to the right to depress the member portion 106, thereby causing the control lever 92 to rock in a counterclockwise direction as viewed in Fig. 2. This is followed by counterclockwise rocking of the link means 80 which in turn causes the piston 38 to move angularly in the same direction. Since the rod 88 is fixed to the piston and is keyed to the valve arm 52, the valve arm will swing angularly to the right and the valve ball 54 will block the left hand port 42, leaving the right hand port 40 open to the right hand brake cyinder 32. Therefore, depression of the pedal 22 will apply only the right hand brake. Equivalent results for the individual application of the left hand brake will be accomplished by depressing the left hand member portion 108. Selection of the position of the valve means 50 may be accomplished even while the pedal 22 is being depressed.

Other features and advantages of the invention, not categorically enumerated herein, will undoubtedly occur to those versed in the art, as will many modifications and alterations in the preferred embodiment disclosed, all of which may be achieved without departing from the spirit and scope of the invention.

What is claimed is:

1. A vehicle brake system, comprising: first and second brake cylinders; a master cylinder having first and second fluid ports connected respectively to the first and second brake cylinders and radially offset from and spaced apart angularly as respects the master cylinder axis; a piston movable axially in the master cylinder for moving fluid through the ports; a radial valve member coaxial with the piston and movable angularly about said axis among a neutral position between and uncovering both ports, a first active position blocking only the first port, and a second active position blocking only the second port; a control rod coaxial with the piston and valve member and angularly movable with said valve member; piston-actuating means connected to and for moving the piston; and selection means mounted on the piston-actuating means and connected to and for moving the control rod angularly to select any one of the aforesaid valve member positions.

2. The invention defined in claim 1, in which: the control rod is connected to the piston member for axial movement with said piston, and said rod is connected to the valve member for axial movement relative to said member.

3. A vehicle brake system, comprising: first and second brake cylinders; a master cylinder having first and second fluid ports connected respectively to the first and second brake cylinders and radially offset from and spaced apart angularly as respects the master cylinder axis; a piston member movable axially in the master cylinder for moving fluid through the ports, said piston member further being movable angularly relative to the master cylinder; a radial valve member coaxial with the piston member and movable angularly among a neutral position between and uncovering both ports, a first active position blocking only the first port and a second active position blocking only the second port; a control rod connected coaxially to the piston and valve members for moving the valve member angularly in response to angular movement of the piston member, said control rod being movable axially relative to one of said members as the piston member moves axially; piston-actuating means connected to and for moving the piston member; and selection means mounted on the piston-actuating means and connected to and for moving the piston member angularly to select any one of the aforesaid valve member positions.

4. A vehicle brake system, comprising: first and second brake cylinders; a master cylinder having first and second fluid ports connected respectively to the first and second brake cylinders and radially offset from and spaced apart angularly as respects the master cylinder axis; a piston member movable axially in the master cylinder for moving fluid through the ports, said piston member further being movable angularly relative to the master cylinder; a radial valve member coaxial with the piston member and movable angularly among a neutral position between and uncovering both ports, a first active position blocking only the first port and a second active position blocking only the second port; a control rod connected coaxially to the piston and valve members for moving the valve member angularly in response to angular movement of the piston member, said control rod being movable axially relative to one of said members as the piston member moves axially; a brake lever rockable about a pivot transverse to the master cylinder axis; link means connected at one end to the piston member for axial and angular movement with the piston member and connected at its other end to the brake lever for movement axially by said lever but movable angularly relative to said lever; and selection means on the brake lever for rocking the link means to turn the piston and hence to turn the valve member for selecting any one of the aforesaid valve members positions.

5. The invention defined in claim 4, in which: the brake lever has a manual-force-receiving portion remote from said brake lever pivot; the selection means includes a control lever pivoted intermediate its ends on the brake lever on a pivot parallel to the brake lever pivot and intermediate said brake lever pivot and said manual-force-receiving portion, said control lever having one end proximate to the link means and its other end proximate to said manual-force-receiving portion; means connecting the link means to the proximate end of the control lever for rocking the link means in response to rocking of the control lever relative to the brake lever; and manual-force-receiving means at the other end of the control lever for rocking the control lever.

6. The invention defined in claim 5, in which: the brake lever is a depressible pedal and the manual-force-receiving portion thereof is a pedal face; and the manual-force-receiving means at said other end of the control lever includes a rockable member having opposite end portions and pivoted intermediate said end portions on the pedal for selective depression of either of said rockable member ends in the direction of depression of the pedal, said rockable member having yieldable centering means holding said rockable member in a neutral position, the ends of said rockable member being spaced apart at the pedal face to enable an operator's foot to be placed on said face.

7. A vehicle brake system, comprising: first and second brake cylinders; a master cylinder having first and second fluid ports connected respectively to the first and second brake cylinders and radially offset from and spaced apart angularly as respects the master cylinder axis; a valve member coaxial with the master cylinder and extending radially toward the ports for angular movement among a neutral position between the ports and first and second active positions respectively overlying the first and second ports, said arm having a port-engaging element biased into partial entry into and for blocking the respective port when in an active position to achieve a detent function tending to retain such position; a piston member movable in the master cylinder for effecting transmission of fluid through either or both of the ports according to the valve member position; piston-actuating means connected to and for moving the piston member; and selection means mounted on the piston member for selecting any one of the aforesaid valve member positions.

8. A vehicle brake system, comprising: first and second brake cylinders; a master cylinder having first and second fluid ports connected respectively to the first and second brake cylinders and radially offset from and spaced apart angularly as respects the master cylinder axis; a radial valve member coaxial with the master cylinder and angularly positionable among a neutral position uncovering both ports, a first active position blocking only the first port and a second active position blocking only the second port; a piston member angularly movable in the master cylinder and also movable axially in the master cylinder for effecting the transmission of fluid through either or both of the ports according to the position of the valve member; a control rod fixed to the piston and having an axially keyed connection to the valve member so that angular movement of the piston member causes angular movement of the valve member among its positions while enabling axial movement of the piston member relative to the valve member; means connected to and for moving the piston axially; and means connected to and for moving the piston angularly.

9. A vehicle brake system, comprising: first and second brakes; a master brake controller; first and second brake-applying elements connected respectively to the first and second brakes and selectively energizable in unison or individually for respectively applying both brakes simultaneously or either brake individually; a positionable control member having a neutral position connecting both elements to the master controller for energization in unison, a first active position connecting only the first element to said controller for energizing only said first element and a second active position connecting only the second element to said controller for energizing only said second element; means connected to and for actuating the controller; and selection means mounted on and movable relative to the controller-actuating means and connected to the control member for selecting any one of the aforesaid positions of said control member prior to operation of said controller-actuating means.

10. A vehicle brake system, comprising: first and second brake cylinders; a master cylinder having first and second fluid ports connected respectively to the first and second brake cylinders; a piston movable in the cylinder for moving fluid through said ports; settable valve means having a neutral setting enabling fluid flow through both ports, a first active setting blocking only the first port and a second active setting blocking only the second port; piston-actuating means connected to and for moving the piston and including a brake-pedal having a foot-receiving face by means of which the pedal is depressible to move the piston; and selection means including a control member mounted on the pedal for movement relative thereto among a neutral position and first and second active positions corresponding respectively to the neutral and first and second active settings of the valve means, said member having first and second portions projecting beyond the pedal face and spaced apart so that an operator's foot may be received by said face between and free from said portions or either of said portions may be foot-engaged prior to foot-engagement with the pedal face.

11. A vehicle brake system, comprising: first and second brake cylinders; a master cylinder having first and second fluid ports connected respectively to the first and second brake cylinders; a piston movable in the cylinder for moving fluid through said ports; settable valve means having a neutral setting enabling fluid flow through both ports, a first active setting blocking only the first port and a second active setting blocking only the second port; piston-actuating means connected to and for moving the piston and including a movable control element having a portion by means of which the element is receivable of manual force to move the piston; and selection means including a selector member mounted on the element for movement relative thereto among a neutral position and first and second active positions corresponding respectively to the neutral and first and second active settings of the valve means, said selector member having first and second portions adjacent to the element portion and positioned so that manual force may be received by said element portion free from said selector member portions or either of said selector member portions may be manually engaged prior to manual engagement with the element portion.

12. A vehicle brake system, comprising: first and second brake cylinders; a master cylinder having first and second fluid ports connected respectively to the first and second brake cylinders and radially offset from and spaced apart angularly as respects the master cylinder axis; a piston movable axially in the master cylinder for moving fluid through the ports; settable valve means having a neutral setting enabling fluid flow through both ports, a first active setting blocking only the first port and a second active setting blocking only the second port; a valve control member coaxial with the piston member and movable about said axis to selectively incur the settings of the valve means; piston-actuating means connected to and for moving the piston; and selection means mounted on the piston-actuating means and connected to and for moving the valve control member angularly to select any one of the aforesaid valve member settings.

13. A vehicle brake system, comprising: first and second brake cylinders; a master cylinder having first and second fluid ports connected respectively to the first and second brake cylinders; a piston movable in the cylinder for moving fluid through said ports; settable valve means having a neutral setting enabling fluid flow through both ports, a first active setting blocking only the first port and a second active setting blocking only the second port; a single movable brake control element connected to and for moving the piston; and selection means movable on said element and connected to the valve means for selecting a valve setting prior to movement of said element.

14. A vehicle brake system, comprising: first and second brake cylinders; a master cylinder having first and second fluid ports connected respectively to the first and second brake cylinders; a piston movable in the cylinder for moving fluid through said ports; settable valve means having a neutral setting enabling fluid flow through both ports, a first active setting blocking only the first port and a second active setting blocking only the second port; a single movable brake control element connected to the piston and movable in one direction to cause the piston to move fluid through one or both ports, according to the valve means setting, and movable in the opposite direction to reverse the piston; and selection means connected to the valve means and mounted on the control element for movement bodily therewith but shiftable relative thereto for receiving a preliminary selecting force in the aforesaid one direction of movement of said element to thereby select a valve means setting and being thereafter movable in unison with said element.

15. A vehicle brake system, comprising: first and second brake cylinders; a master cylinder having first and second fluid ports connected respectively to the first and second brake cylinders; a piston movable in the cylinder for moving fluid through said ports; settable valve means having a neutral setting enabling fluid flow through both ports, a first active setting blocking only the first port and a second active setting blocking only the second port; piston-actuating means connected to and for moving the piston; and selection means mounted on the piston-actuating means and including a valve-means operating member coaxial with the piston and connected to the valve means for selecting any of the aforesaid valve means settings.

References Cited in the file of this patent

UNITED STATES PATENTS

| | | |
|---|---|---|
| 2,591,171 | Lohse | Apr. 1, 1952 |
| 2,741,337 | Ziskal | Apr. 10, 1956 |